United States Patent
Viet-Doan

(10) Patent No.: US 11,083,330 B2
(45) Date of Patent: Aug. 10, 2021

(54) PORTABLE COFFEE BREWER

(71) Applicant: OXX Products, LLC, St. Joseph, MI (US)

(72) Inventor: Jimmy Quang Viet-Doan, St Joseph, MI (US)

(73) Assignee: OXX PRODUCTS LLC, St. Joseph, MI (US)

( * ) Notice: Subject to any disclaimer, the term of this patent is extended or adjusted under 35 U.S.C. 154(b) by 212 days.

(21) Appl. No.: 14/783,607

(22) PCT Filed: Apr. 11, 2014

(86) PCT No.: PCT/US2014/033864
§ 371 (c)(1),
(2) Date: Oct. 9, 2015

(87) PCT Pub. No.: WO2014/169248
PCT Pub. Date: Oct. 16, 2014

(65) Prior Publication Data
US 2016/0058242 A1    Mar. 3, 2016

Related U.S. Application Data

(60) Provisional application No. 61/810,781, filed on Apr. 11, 2013.

(51) Int. Cl.
*A47J 31/00* (2006.01)
*A47J 31/56* (2006.01)
(Continued)

(52) U.S. Cl.
CPC ............. *A47J 31/56* (2013.01); *A47J 31/005* (2013.01); *A47J 31/3695* (2013.01);
(Continued)

(58) Field of Classification Search
CPC .......... A47J 31/52; A47J 31/057; A47J 31/46; A47J 31/407; A47J 31/56; A47J 31/462
(Continued)

(56) References Cited

U.S. PATENT DOCUMENTS 3,083,450 A * 4/1963 Harvey .................... A47J 37/08
99/288
3,813,517 A * 5/1974 McGruder ............ A47J 31/005
219/438
(Continued)

FOREIGN PATENT DOCUMENTS

CN    1533254 A    9/2004
CN    202674445    1/2013
(Continued)

OTHER PUBLICATIONS

International Search Report & Written Opinion for PCT/US2014/033864, dated Aug. 29, 2014, 8 pages.
(Continued)

*Primary Examiner* — Tu B Hoang
*Assistant Examiner* — Masahiko Muranami
(74) *Attorney, Agent, or Firm* — Foley & Lardner LLP

(57) ABSTRACT

This invention relates to a portable, ruggedized, impact resistant appliance for brewing a beverage having a water tank system, a water delivery system, a brewing system, electronics capable of brewing a beverage, and a user interface for controlling said electronics.

20 Claims, 14 Drawing Sheets

(51) Int. Cl.
*A47J 31/36* (2006.01)
*B65D 81/02* (2006.01)
*A47J 31/46* (2006.01)
*B65D 41/02* (2006.01)
*B65D 51/16* (2006.01)
*A47J 31/40* (2006.01)

(52) U.S. Cl.
CPC ............ *A47J 31/407* (2013.01); *A47J 31/462* (2013.01); *B65D 41/023* (2013.01); *B65D 51/1644* (2013.01); *B65D 81/02* (2013.01)

(58) Field of Classification Search
USPC ......... 99/276, 279, 280, 283, 285, 286, 295, 99/297, 300, 317; 426/431, 433, 590, 77, 426/79, 84
See application file for complete search history.

(56) References Cited

U.S. PATENT DOCUMENTS

| | | | |
|---|---|---|---|
| 4,205,598 | A | 6/1980 | Leuschner |
| 4,445,539 | A | 5/1984 | Credle |
| 4,516,484 | A | 5/1985 | De Ponti |
| 5,154,317 | A * | 10/1992 | Roppolo, III ............ B05B 9/007 222/331 |
| 6,082,247 | A | 7/2000 | Beaulicu |
| 6,357,342 | B1 * | 3/2002 | Leung .................. A47J 31/4403 248/317 |
| 6,701,826 | B2 | 3/2004 | Wu |
| 8,360,279 | B1 * | 1/2013 | Giles ..................... A47J 31/401 141/256 |
| 2003/0034359 | A1 * | 2/2003 | Lassota .................... B67D 1/06 222/185.1 |
| 2003/0066431 | A1 | 4/2003 | Fanzutti et al. |
| 2004/0149139 | A1 * | 8/2004 | Kollep .................. A47J 31/005 99/279 |
| 2004/0231523 | A1 * | 11/2004 | Kraan ................... A47J 31/368 99/295 |
| 2005/0103213 | A1 * | 5/2005 | Dumm .................... A23C 3/031 99/483 |
| 2005/0150824 | A1 * | 7/2005 | Birdsell .................. C02F 1/003 210/244 |
| 2005/0199130 | A1 * | 9/2005 | Palese ................... A47J 31/005 99/279 |
| 2005/0268790 | A1 * | 12/2005 | Baldacci ............. A47J 31/4496 99/285 |
| 2006/0107841 | A1 * | 5/2006 | Schifferle ........... A47J 31/0668 99/279 |
| 2010/0071562 | A1 * | 3/2010 | Brezovnik .......... A47J 31/3676 99/280 |
| 2010/0162897 | A1 * | 7/2010 | Ozanne ................. A47J 31/407 99/280 |
| 2011/0110180 | A1 * | 5/2011 | Snider ................... A47J 31/407 366/142 |
| 2011/0117248 | A1 | 5/2011 | Rivera |
| 2011/0239869 | A1 * | 10/2011 | Herbst .................... A47J 31/00 99/279 |

FOREIGN PATENT DOCUMENTS

| | | |
|---|---|---|
| CN | 103458746 A | 12/2013 |
| DE | 29 07 495 | 9/1980 |
| DE | 3404320 | 9/1984 |
| FR | 2842089 | 1/2004 |
| JP | 61-164527 A | 7/1986 |
| JP | 02-261413 A | 10/1990 |
| JP | 2007-522856 A | 8/2007 |
| JP | 2010-528751 A | 8/2010 |
| JP | 2011-505933 A | 3/2011 |
| WO | WO-03/009729 A1 | 2/2003 |
| WO | WO-2005/079638 A1 | 9/2005 |
| WO | WO-2008/149297 A1 | 12/2008 |
| WO | WO 2009/027131 | 3/2009 |
| WO | WO-2009/074550 A2 | 6/2009 |
| WO | WO2012/063273 | 5/2012 |
| WO | WO-2012/063273 A1 | 5/2012 |

OTHER PUBLICATIONS

Partial Supplementary European Search Report for EP 14782744.8, dated Nov. 21, 2016, 7 pages.
Extended European Search Report for EP 14782744.8, dated May 15, 2017, 13 pages.
First Office Action for CN 201480028704.8, dated Oct. 16, 2017, 11 pages. (with translation).
Office Action for JP 2016-507693, dated Dec. 22, 2017, 43 pages. (with translation).
Second Office Action for CN 201480028704.8, dated Jul. 10, 2018, 14 pages. (with translation).
Third Office Action for CN 201480028704.8, dated Feb. 20, 2019, 12 pages. (with translation).

* cited by examiner

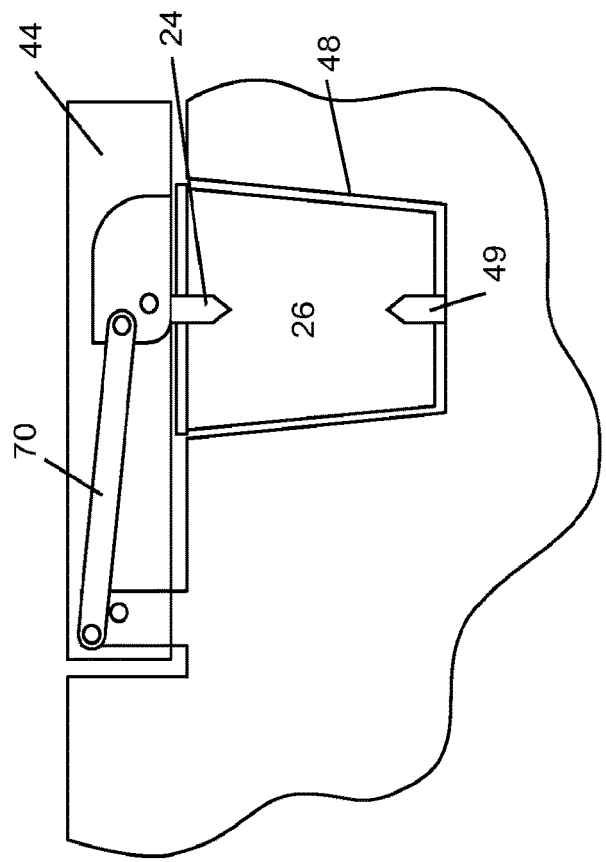
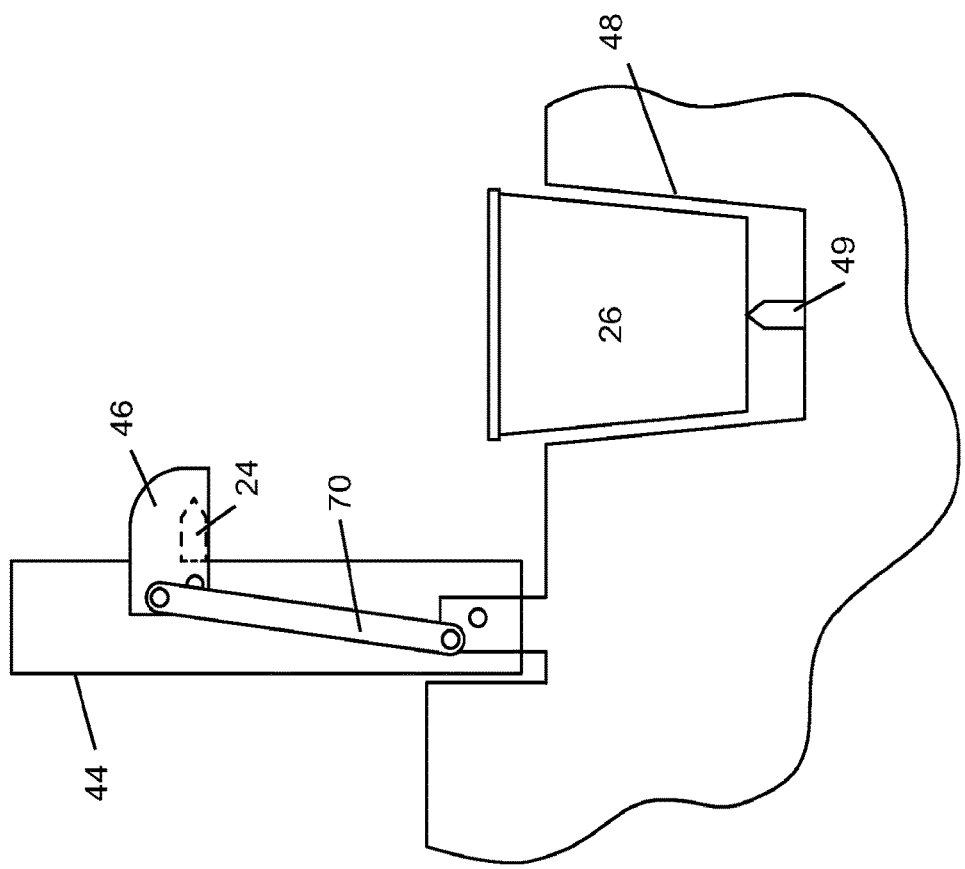
Fig. 7b
Fig. 7a

PORTABLE COFFEE BREWER

CROSS-REFERENCE TO RELATED APPLICATIONS

This application claims priority to an earlier filed U.S. provisional application entitled Portable Coffee Brewer filed on Apr. 11, 2013 and assigned U.S. Application No. 61/810,781.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A COMPACT DISC

Not Applicable.

BACKGROUND OF THE INVENTION

The invention relates to a device that serves as a portable coffee brewer. More specifically it relates to a portable coffee brewer that is rugged, compact, and can embody multiple configurations based on a user's need.

Single serve coffee brewers have become extremely popular in home settings. Some of the best known examples are seen in the Keurig®, Senseo®, and Tassimo® systems. The systems each use a specially designed cup, sometimes described as a pod, to be placed within the brewer to brew a beverage when water is run through the pod. Over the past few years, the market for these brewers has grown so much that it is now one of the fastest growing segments of the home market. Consumers enjoy the convenience of brewing a single cup of coffee or tea rather than a whole pot and individuals within the same household can enjoy hot beverages of their own individual preference. While this market has become increasingly popular in the home setting, there is now a demand to take this convenience outside the home.

The problem with conventional coffee brewers is that they are designed for household or office use only. They are designed to only operate in indoor environments where they remain stationary, usually placed on a table or countertop. However, many people (construction workers and campers, for example) spend much of their day outdoors or in environments that are much harsher and require products that are specially designed to operate in a multitude of environments with extreme conditions. These devices need to anticipate frequent transportation, storage with other gears and supplies, frequent impact, weather conditions, various terrains, dirt, debris and various other outdoor environmental conditions. Conventional household appliances would not be practical for these environments. For example, many single serve coffee brewer have water tanks that would easily spill water it the device was carried to another location. Their designs do not anticipate operating in outdoor environments where there is a need to be extremely rugged, portable, stowable, and preventing the ingress of water, dirt or debris. This invention solves the problem by providing a more rugged, sealed, portable, and stowable system for brewing a beverage suitable for outdoor use. The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

BRIEF SUMMARY OF THE INVENTION

This invention relates an appliance for brewing a beverage comprising:

an external housing having a water tank system door and a brewing system door; said external housing encapsulates a water tank system, a brewing system, and a water delivery system;

an internal support frame supporting the external housing;

the sealed water tank system further comprising a removable, portable and impact resistant water tank with a sealed and removable cap and a sealed water system valve coupled to the water delivery system;

the brewing system with a brewing chamber for receiving a single serve beverage capsule;

the water delivery system further comprising tubing a flow meter, pump, heater, and flow valve;

electronics for controlling the mechanical system; and a user interface for controlling said electronics upon receiving a command from user input;

a protective frame surrounding the user interface, water tank system door, and brewing system door;

wherein the water tank system is joined to the water delivery system by the tubing that allows water to flow out of the top of the water tank; wherein the water delivery system is joined to the brewing system by the tubing and wherein the external housing further comprises a base having at least one vertical wall wherein the base and at least one vertical wall is one piece.

A user interface allows a person to set the desired brewing options. Control electronics, such as timers, sensors and relays, in turn, determine the performance of any electrical components. This user interface is shock proof, dust proof, and water proof. One skilled in the art will recognize that the user interface is ruggedized to withstand harsh conditions. The user interface is also anticipated to be recessed within a protective frame within the appliance to protect it from impacts from other objects.

When this portable appliance in position to be operated, it is anticipated that the water tank system and namely, the water tank will be in generally the upright position as the preferred embodiment draws water out of the top of the water tank. One skilled in the art will recognize that while an upright position is anticipated, it may be anticipated that this appliance is also designed to operate a certain angle of tolerance as well. A slight angle should not impact the operation of the appliance.

The water tank is removable, replaceable, portable and impact resistant. It is to be placed inside the appliance in the water tank compartment and completely concealed. Once placed inside the water tank compartment with the water tank system door closed it is protected from impact from an object. This water tank may comprise a rigid or semi-rigid material that fits inside of water tank compartment within the appliance. A water system door allows access into and out of the water tank compartment.

The water tank is sealable by a cap or other sealing means so that water may not spill out regardless of the orientation of the water tank when removed from the appliance. The cap or other sealing means are removable, replaceable, and resealable to allow water to be refilled into the water tank. The water tank is coupled to tubing by a water system valve on the water tank that only allows water to flow in one direction out of the water tank when the water system is activated. This water tank is anticipated to not leak or drip regardless of the orientation of the water tank as the water system valve and cap are sealed. The water tank is also easily flexible, spill proof, and impact resistant. One skilled in the art will recognize that the water tank may be removable to allow for a user to bring multiple containers and replace them as needed.

The water tank cap further comprises an air hole and air hole seal. The air hole allows air to enter the water tank to equalize the pressure as water is drawn out of the water tank and into the water delivery system. The air hole seal prevents water from exiting the air hole regardless of the orientation of the water tank. The water tank compartment is accessible through a water tank system door anticipated to be at the top of the appliance but one skilled in the art will recognize that it may be in another location. This water tank system door may be completely removable or may simply open while remaining affixed to the container. This water tank system door may also be reinforced to increase the strength and durability of the container. For purposes of describing this invention, the water tank system door will be discussed as the door opening on a hinge affixed to the container, either on a side swing or a swing from the top. One skilled in the art will recognize that the tubing runs through this water system door and therefore a joint is to be utilized to protect the integrity of the tubing while the water system door is opening or closing. The water system door must open far enough to allow the placement of the water tank within the water tank compartment. While 90 degrees would be an acceptable angle for opening, it is anticipated that a smaller or larger angle of opening would be suitable. The coupling of the tubing to the water tank is only made when the water system door is closed.

A water system valve joins the water tank to the tubing of this appliance. This water system valve comprises a cap having at least one seal over a spring. This water system valve joins with a tube located within the water tank. A water filter may be located between the tube and the water system valve in cases where it is desirable to filter the water within the water tank. One skilled in the art will recognize that the water system may comprise a filter indicator that indicates when the filter is to be changed.

When the water tank system door is in the closed position, the tubing presses against the seal located within the valve cap. This seal in turn presses against a spring which allows water to flow from the tube into the water system valve and out into the tubing of the appliance.

One skilled in the art will also recognize that this device may be stored in any position as it is a sealed container which prohibits the spilling or leaking of water from the water tank. When a user wishes to brew a beverage, he/she or she placed a beverage capsule into the brewing chamber within the portable appliance. This beverage capsule is filled with coffee beans, tea leaves, or any other desired beverage. The user activates the user interface which will in turn activate the electronics controlling the heating technology used. This user interface allows the user to program the brewing technology. One skilled in the art will recognize that there a number or settings that can be implemented such a one touch button with a pre-set brewing time allotment. It is anticipated that a display screen will indicate what a user has programmed, such as the temperature or size of the desired beverage.

The water tank system is connected to the water delivery system by tubing and the water delivery system is connected to the brewing system by tubing. This tubing provides the link from the water tank system through the water delivery system to the brewing system. To brew a beverage, water is drawn up the tube in the water tank through the water system valve into the tubing. The water flows through the flow meter which measures how much water has flowed out of the water tank. The flow meter is important as a user can select the size of the beverage desired. As the water flows from the flow meter, it is pumped by the pump into the heater. The water is heated and enters a valve that determines if the water is to flow to a beverage capsule via a beverage line or if the water is simply to flow out of the appliance through a water line into a cup as heated water. For a brewed beverage the heated water flows through the beverage capsule within the brewing system.

The pump is anticipated to be any pump capable of moving the water through the appliance at a desired pressure. The desired pressure may vary depending on the type of beverage to be brewed. For example, espresso must be brewed at a higher pressure than that of coffee so an espresso beverage brewer would utilize a larger, more powerful pump.

In order to brew a beverage, a beverage capsule is placed into the brewing system at the brewing chamber. The brewing chamber is anticipated to be operable in the closed position so to access the chamber, it must be opened at a brewing system door. This brewing system door is anticipated to be at the top of the appliance but one skilled in the art will recognize that it may be in another location. This brewing system door may be completely removable or may simply open while remaining affixed to the container. This brewing system door may also be reinforced to increase the strength and durability of the container. For purposes of describing this invention, the brewing system door will be discussed as the door opening on a hinge affixed to the container, either on a side swing or a swing from the top. One skilled in the art will recognize that the tubing runs through this water system door and therefore a joint is to be utilized to protect the integrity of the tubing while the brewing system door is opening or closing. The brewing system door must open far enough to allow the placement of the beverage capsule within the brewing chamber. While 90 degrees would be an acceptable angle for opening, it is anticipated that a smaller or larger angle of opening would be suitable.

The action of closing the brewing system door will push down the beverage capsule and cause the bottom portion of the beverage capsule to be pierced by an output needle located at the bottom of the brewing chamber. This point at which the output needle punctures the beverage capsule provides an output hole at which brewed beverage can exit the beverage capsule.

The brewing chamber also comprises an input needle located in the brewing chamber door. This input needle may simply be a needle that can pierce the top of the beverage capsule or can be part of a piercing device. If the needle is part of a piercing device, it is anticipated to be hidden when the brewing chamber door is opened and only becomes exposed as the brewing chamber door is closed. Typically the input needle is located underneath a needle cover in the brewing chamber door that mechanically retracts to expose the needle as the brewing chamber door is closed. When the brewing chamber door is opened the needle cover once again protracts to cover the needle. The input needle when exposed then punctures the beverage capsule at a location to allow for water to enter the beverage capsule to brew the beverage.

The brewed beverage will then flow out of the output hole and into a beverage nozzle that dispenses the brewed beverage into a drinking cup. This drinking cup may be a mug, thermos, or other vessel suitable for drinking. This drinking cup is anticipated to sit on a stand located under the brewing system. This stand is foldable and stowable. The stand may also be removable. A removed stand is desirable when the drinking cup is too large to fit under the appliance. The stand can be folded to prevent damage and also provide protection for the water nozzle and beverage nozzle. It is anticipated that the stand be stowed and locked with a latch or other similar locking means. One skilled in the art will recognize that a drinking cup may be stored within the stand and the drinking cup may comprise magnetic properties or mechanical attachment details to be assist in keeping the drinking cup in the appropriate location.

The electronics are powered by a power source. Such sources may include electricity or batteries. The appliance comprises a power source input on the outside of exterior wall. This power source input may be limited to one type of power source or may be convertible to multiple power sources. If there is a power cord, it is anticipated that this will be a retractable cord to be stored within the container when not in use.

The electronics may be housed in a variety of locations within the portable appliance. The location of such electronics varies on the size and design of the portable appliance. In some designs of the portable appliance the electronics will be housed in the base. One skilled in the art will recognize that the location of the electronics does not have an impact on the performance of the portable appliance. One important feature of this invention is that the electronics are within a separate damped internal electronics chassis to prevent damage from shock and impact.

The electronics receive commands from the user interface and issue commands to the mechanical system to activate the appliance.

It is imperative to this invention that this device be portable. Therefore, it is anticipated that the container comprise handles, straps, wheels, carrying case or other methods for easily transporting the container. It is anticipated that a number of arrangements would be suitable for positioning the handles, straps, or wheels. However, for purposes of describing this invention, any strap or handle will be preferably affixed to the sides of the portable appliance. The positioning of the handles, straps, wheels, or other methods for easily transporting the container anticipate that the container will be transported in a generally upright position with water reservoir in an upward position. Any such handles, straps, wheels, or other methods of transporting are anticipated to be removable and rotatable.

Since this appliance is portable, it is extremely important that it is a rugged device so that it can withstand impacts with other objects or even have other heavy objects placed on top of it. The appliance comprises a protective frame and internal support frame to aid in durability and ruggedness of the appliance. The protective frame shields the device from impacts and strikes from another object. The protective extends beyond the user interface, water tank system door, and brewing system door. The protective frame will be mounted to the device and comprises any impact resistant material. The internal support frame adds support to each external housing part so that the appliance can withstand heavy loads from any orientation. Load applied to the external housing from any direction is directly channelled into the internal support frame. This internal support frame supports load in all directions which is unlike typical coffee brewers where load is carried via the housing without another support structure to carry external loads applied to it. The electronics comprise shock proof controls so that impact and vibration does not disturb desired function. The entire appliance is sealed to protect from water intrusion or dust contamination. One skilled in the art will recognize that the electronics must be able to withstand harsh conditions.

The portable appliance for brewing a beverage may also comprise other amenities including but not limited to a cup holder. Other amenities may include a water filter, extra water reservoirs, water hoses (to use for re-filling when on the go), a carrying case, stirrers or spoons. One skilled in the art will recognize that these amenities may be built into the portable device or may be modular in nature.

This portable appliance may also include external mounting points for securely affixing the appliance to a structure with rigid clips, straps or cords with hooks.

This portable device is not limited in shape or size. Sizes can vary from a small, single user brewer to a larger capacity brewer used to hold a larger quantity of water for multiple cups of a beverage. For purposes of describing this invention a generally rectangular appliance is used, but this shape is not to be construed as limiting in any way as other shapes are contemplated. The rectangular shape allows the device to be stowed in any orientation and other items to be stacked on top of it The external housing is constructed so that a single piece constructs the base and at least one other vertical wall. There are no seams from adjoining vertical housing pieces on the bottom of the device. The seams created at the connection of adjacent housing parts are located above the lowest part of the device. This functions to eliminate joints at locations that would likely sustain great impact when the device is accidentally dropped during transport. This also prevents intrusion of water, debris and dust into joints.

The user interface controls, water tank system door, and brewing system door are positioned so that they are recessed with in a protective frame. In this way they are protected from damage that would be sustained from impact from other objects. The protective frame rises about the highest point of the user interface controls, water tank system door and brewing system door.

The device has feet positioned so that the device may be positioned to partially overhang the edge of a support surface such as a table or counter. In this position the cup stand can be removed to accommodate containers that extend below the support surface directly below the nozzles.

BRIEF DESCRIPTION OF THE SEVERAL VIEWS OF THE DRAWINGS

Possible and preferred features of the present invention will now be described with particular reference to the accompanying drawings. However, it is to be understood that the features illustrated in and described with reference to the drawings are not to be construed as limiting on the broad scope of the invention. In the drawings:

FIG. 7A depicts the piercing device cover in its protracted position.

FIG. 7B depicts the piercing device cover in its retracted position.

DETAILED DESCRIPTION OF THE INVENTION

Figure 1:
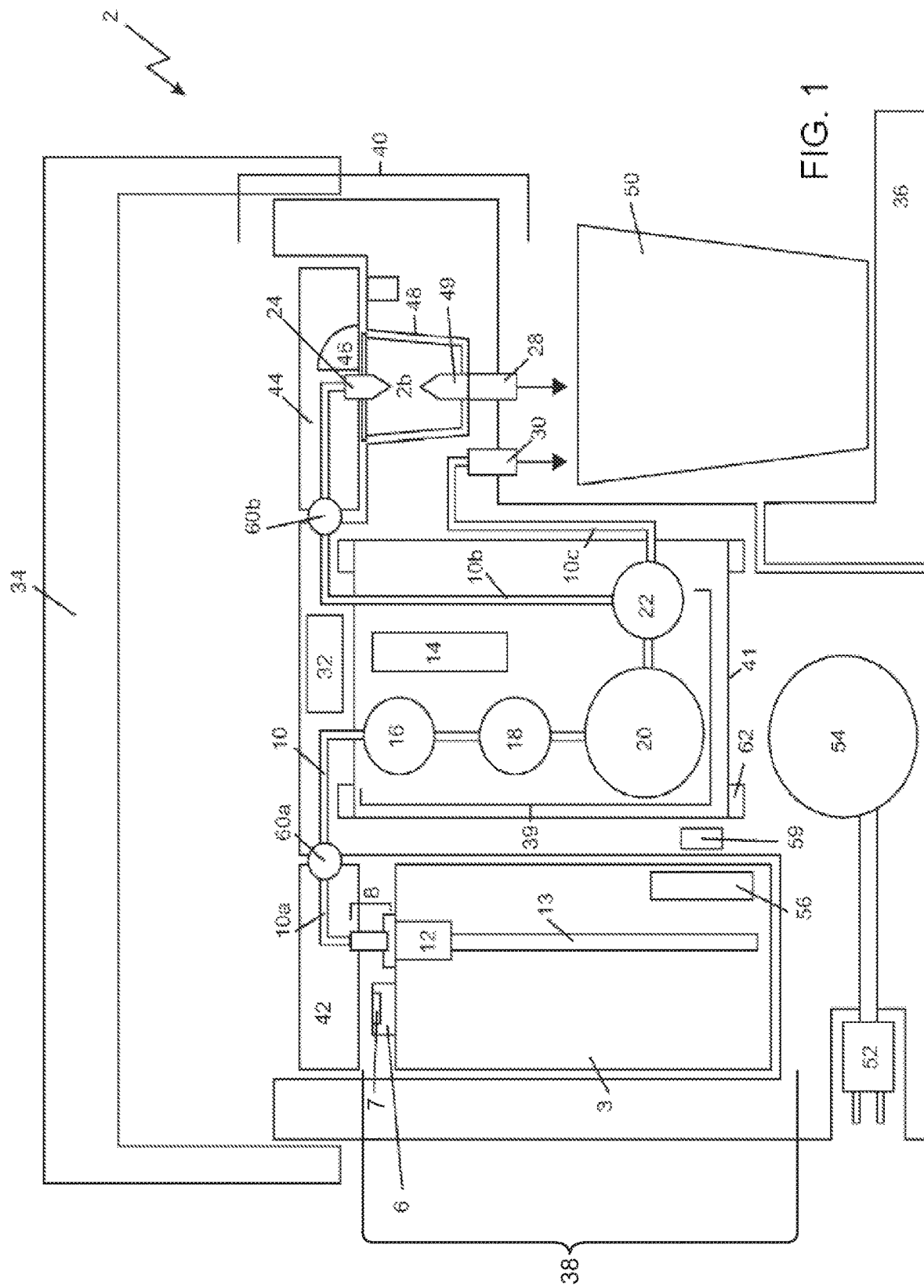
FIG. 1 depicts a schematic of the portable appliance detailing the water system, mechanical system, and brewing system.
Figure 2:
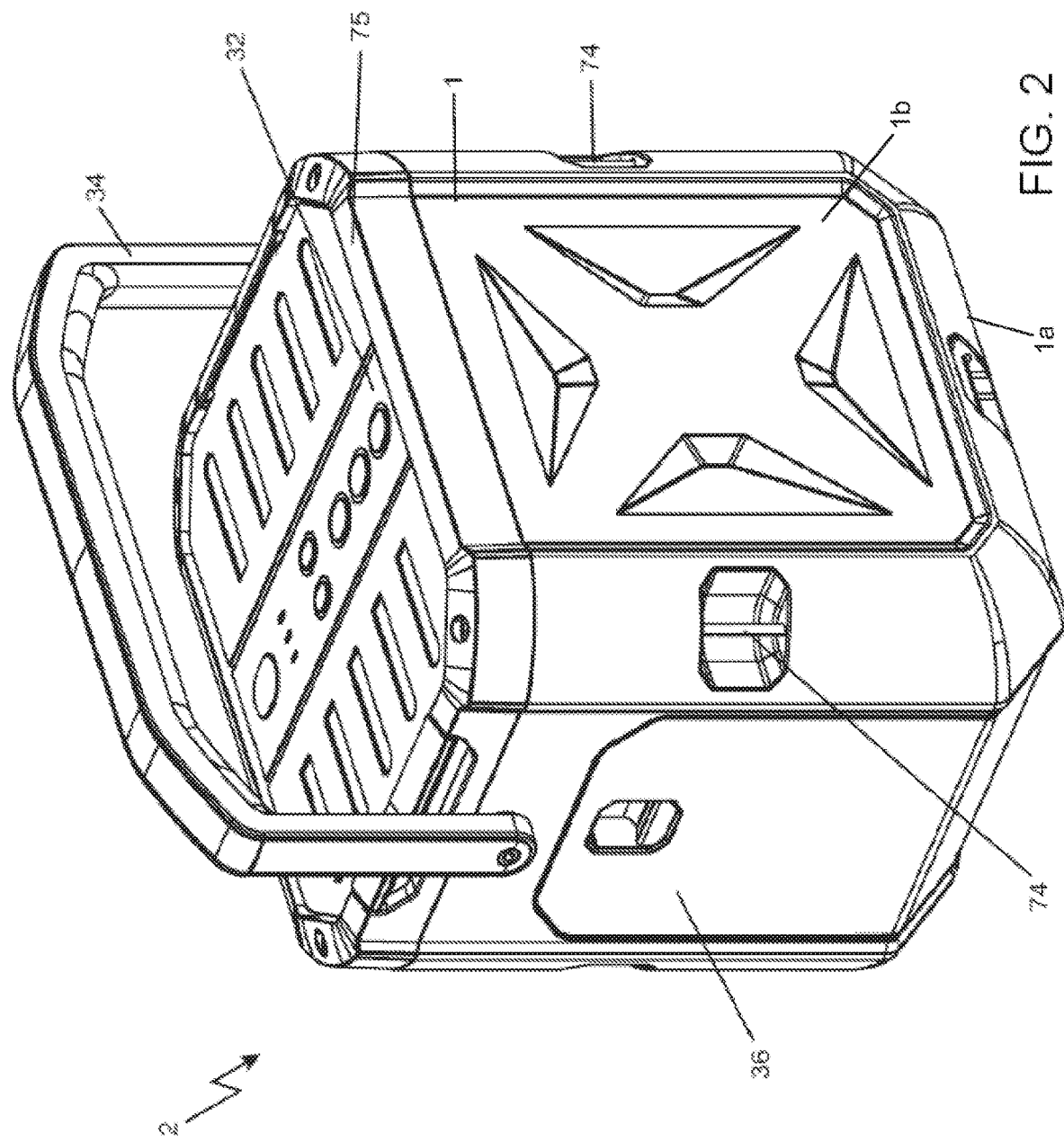
FIG. 2 depicts a view of the portable appliance in the upright, closed position.

Turning now to the Figures, the portable appliance 2 of this invention comprises an external housing 1 encapsulating a water tank system 38, a water delivery system 39, and a brewing system 40. The electronics 14 are also enclosed within the external housing 1 and a user interface 32 is located on an exterior surface of the external housing 1.

Internal support frame 78 is located under the external housing 1 to provide support and protection to the external housing 1 of the appliance 2. A protective frame 75 surrounds the user interface 32, water tank system door 42, and brewing system door 44. This protective frame 75 rises above the user interface 32, the water tank system door 42 and brewing system door 44 so that those parts are recessed below the protective frame 75.

The water tank system 38 is joined to a water delivery system 39 and the water delivery system 39 is joined to a brewing system 40. The water tank system 38 comprises resistant removable water tank 3 having a cap 6, and a water system valve 8. The water delivery system 39 comprises tubing 10, a flow meter 16, pump 18, heater 20 and flow valve 22. The water delivery system 39 is controlled by electronics 14 that can receive commands from the user interface 32 and send commands to the water delivery system 39 for operation of the portable appliance 2. The water tank system 38 is joined to the water delivery system by tubing 10 and the water delivery system 39 is linked to the brewing system by tubing 10. When called, water flows through the tubing 10 from the water tank system 38 to the water delivery system 39 and into the brewing system 40.

Figure 4:
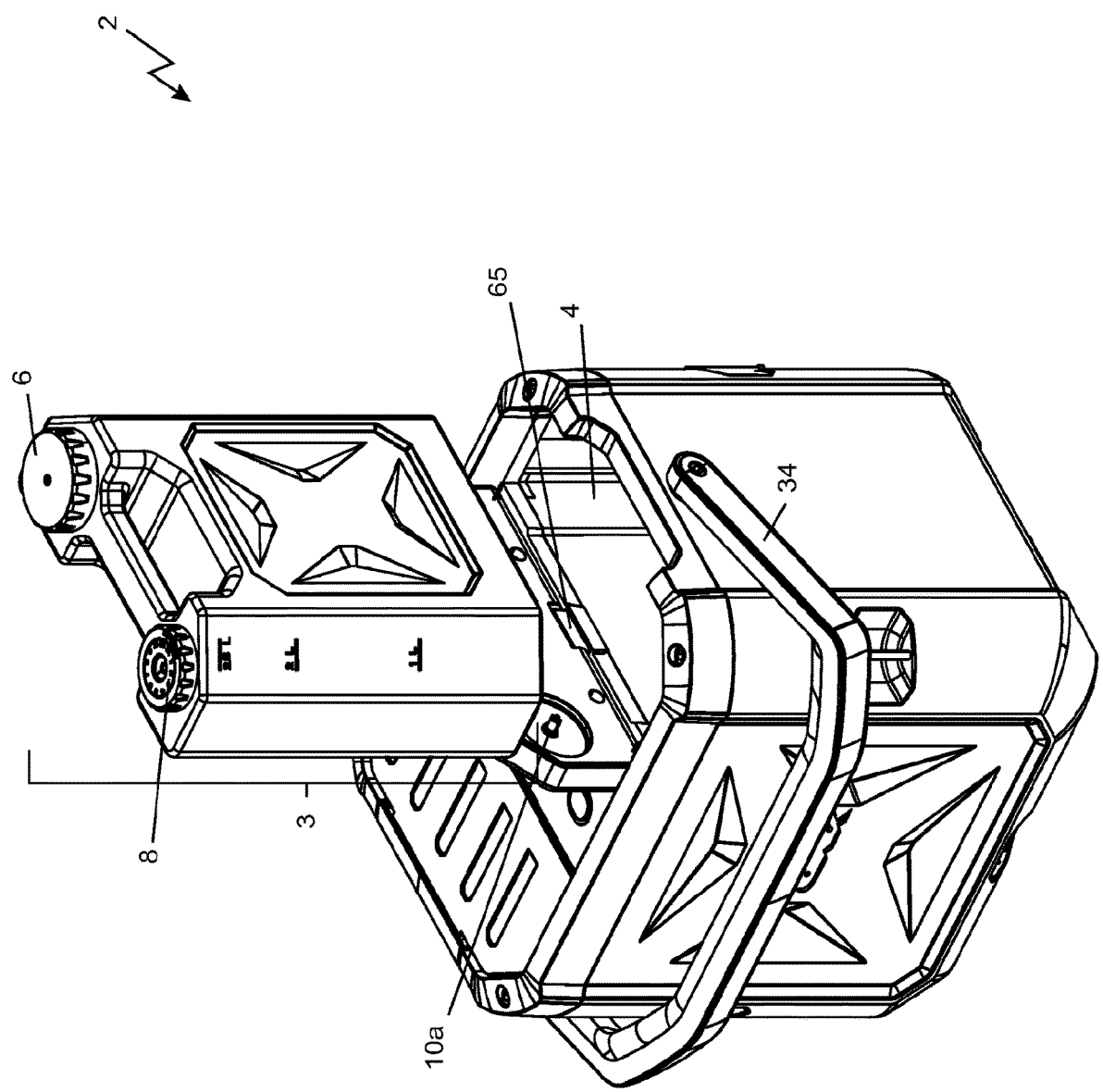
FIG. 4 depicts the water tank removed from the portable appliance and the water system door in the open position exposing the water tank compartment.
Figure 9:
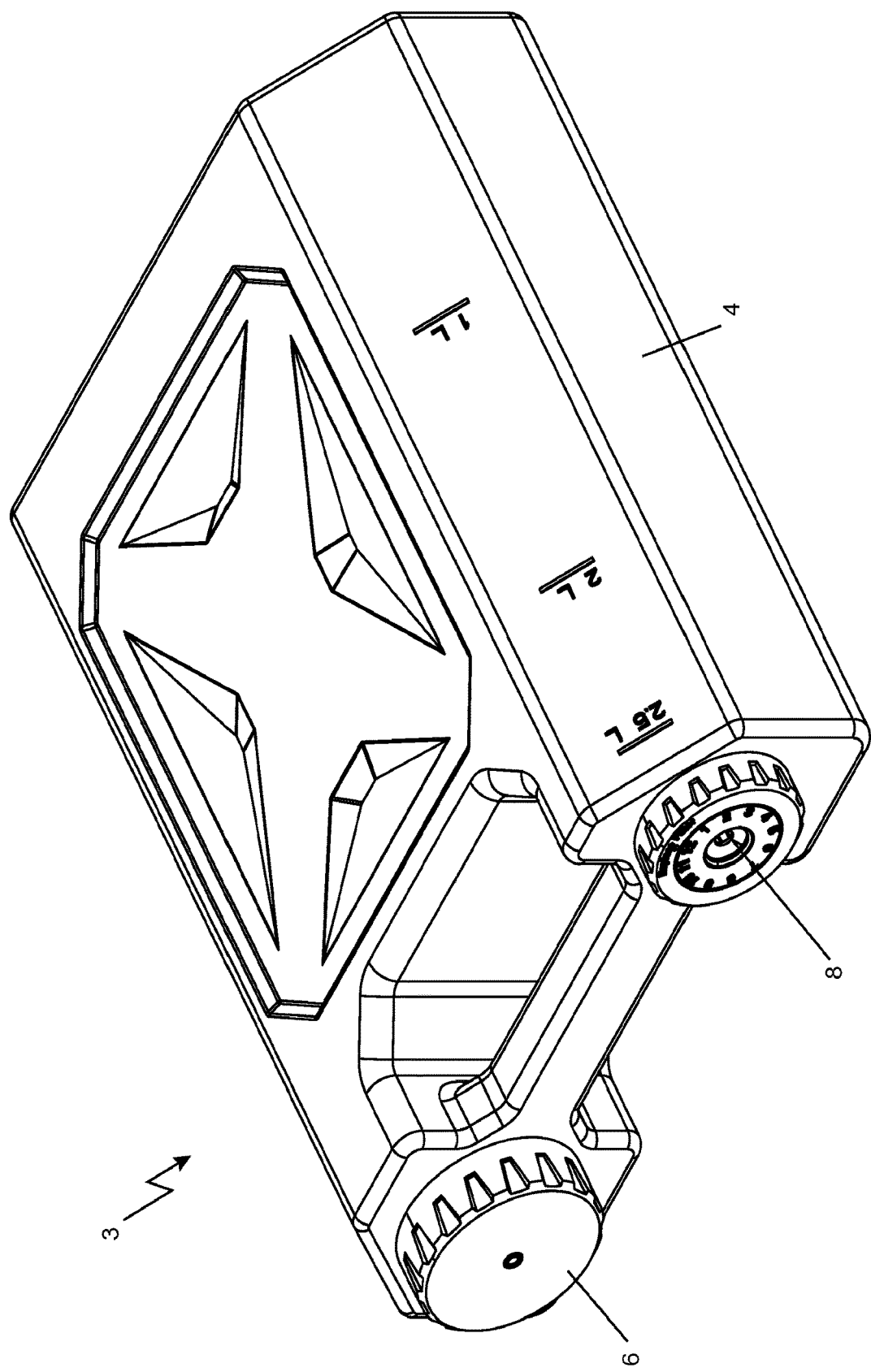
FIG. 9 depicts a perspective view of the water tank stored on its side.
Figure 12:
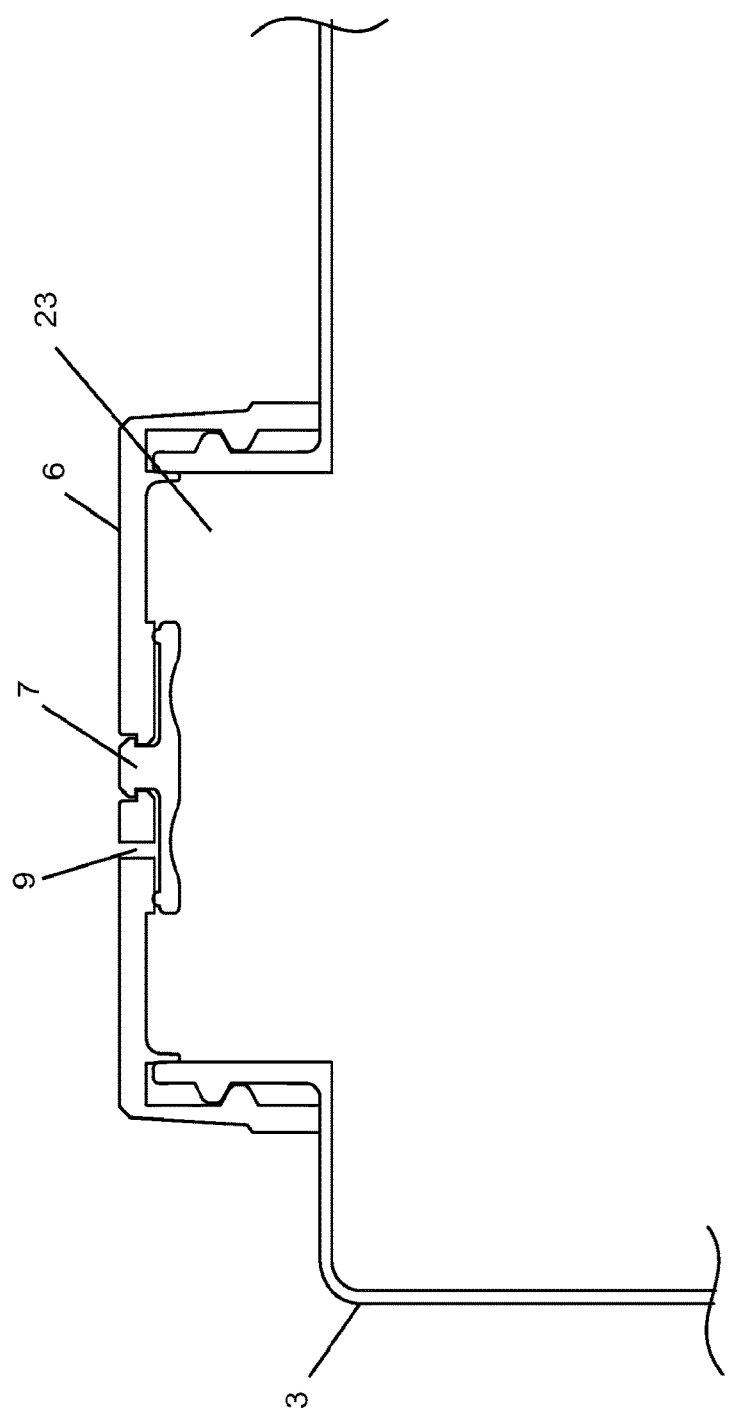
FIG. 12 depicts the water tank cap.

The water tank 3 resides within the water tank compartment 4 of the appliance 2. This water tank 3 is removable as seen in FIGS. 4 and 9. The water tank further comprises a water tank cap 6. This cap 6 is detailed in FIG. 12. The cap 6 is removable and replaceable and further comprises a seal 7. The seal provides a barrier to ensure that water does not escape the air hole 9. A small air hole 9 is included within the cap to provide for air entry when water is being drawn out of the water tank 6. To fill the water tank 3 with water, a user must remove the cap 6. After the water tank 4 is filled, the cap 6 is replaced to close the water tank 6.

Figure 10:
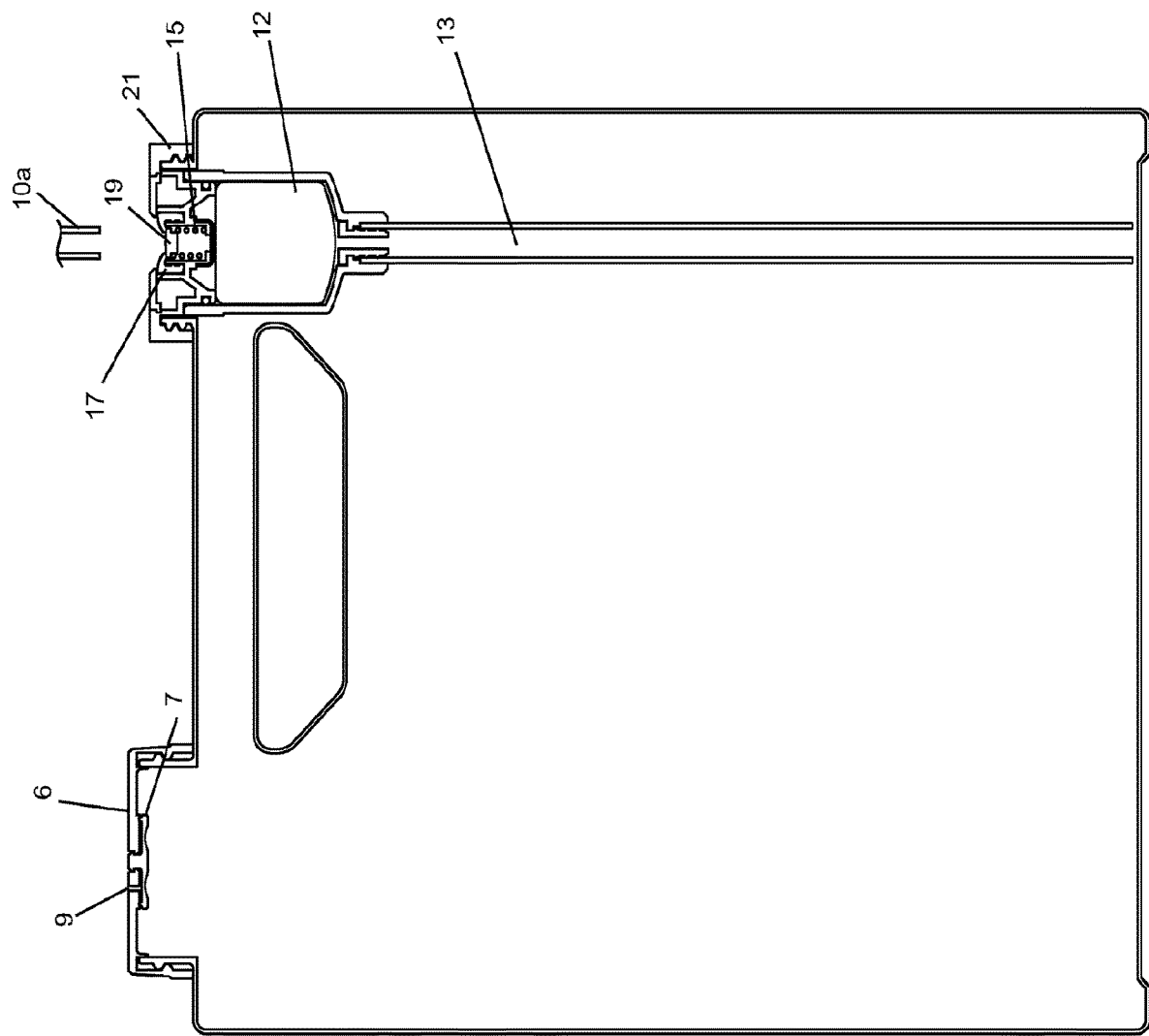
FIG. 10 depicts a cross sectional view of the water tank.
Figure 11:
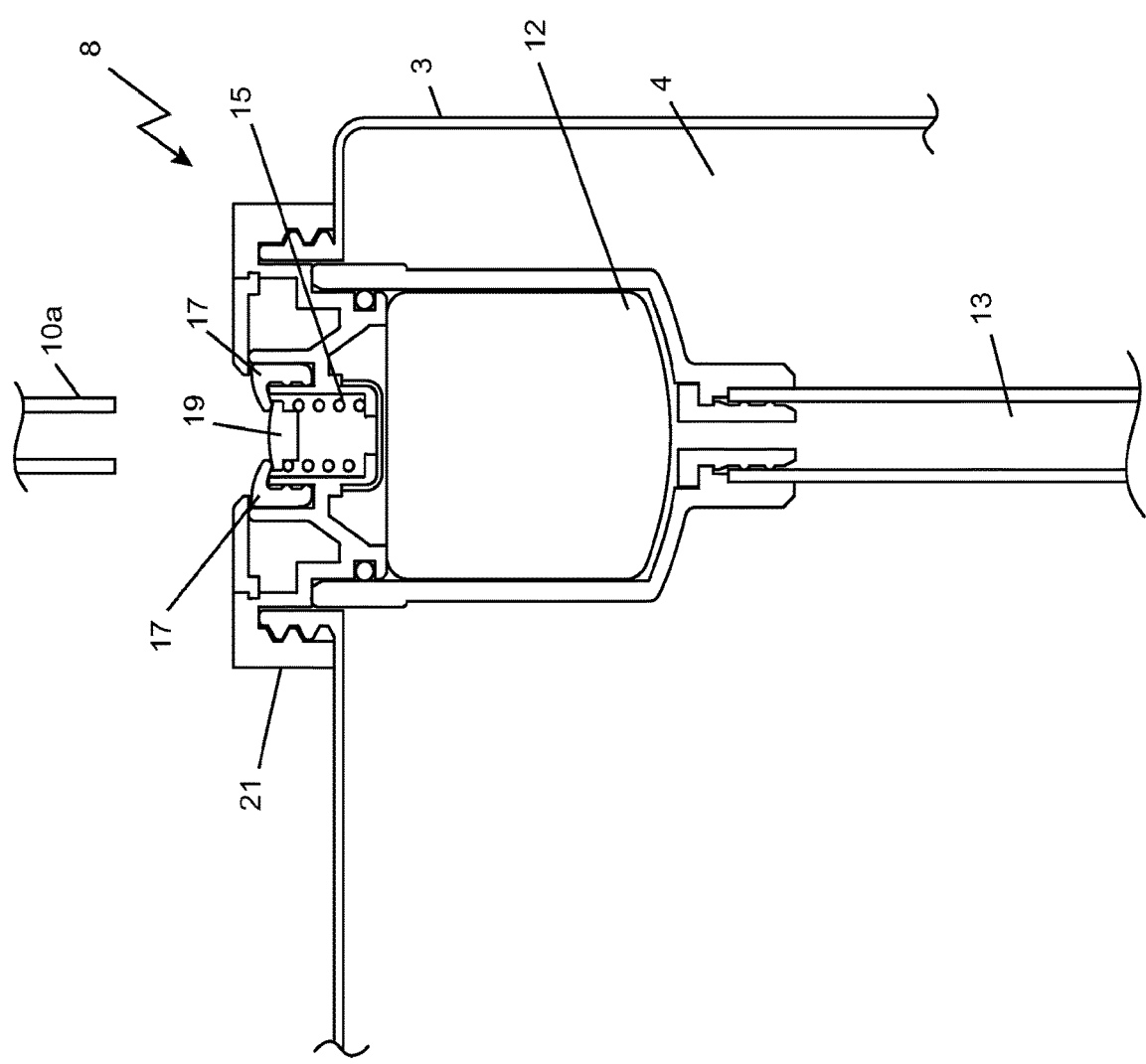
FIG. 11 depicts the water system valve as it connects the water tank to the tubing.

As seen in FIGS. 10 and 11, a tube 13 resides within the water tank 3 and is connected to the water system valve 8. A water filter 12 may also be connected between the tube 13 and water system valve 8. The water system valve 8 provides the exit point for water when it is called for brewing. The water system valve 8 comprises a cap 21 having two seals 17, 19 and a spring 15. Seal 19 covers the opening to the tube 13 and is placed over a spring 15. When tubing 10a is joined to the one-way valve 8 at the seal 19, it presses down on the spring 15 allowing water to exit. Seal 17 further provides a barrier to prevent water leakage.

Figure 3:
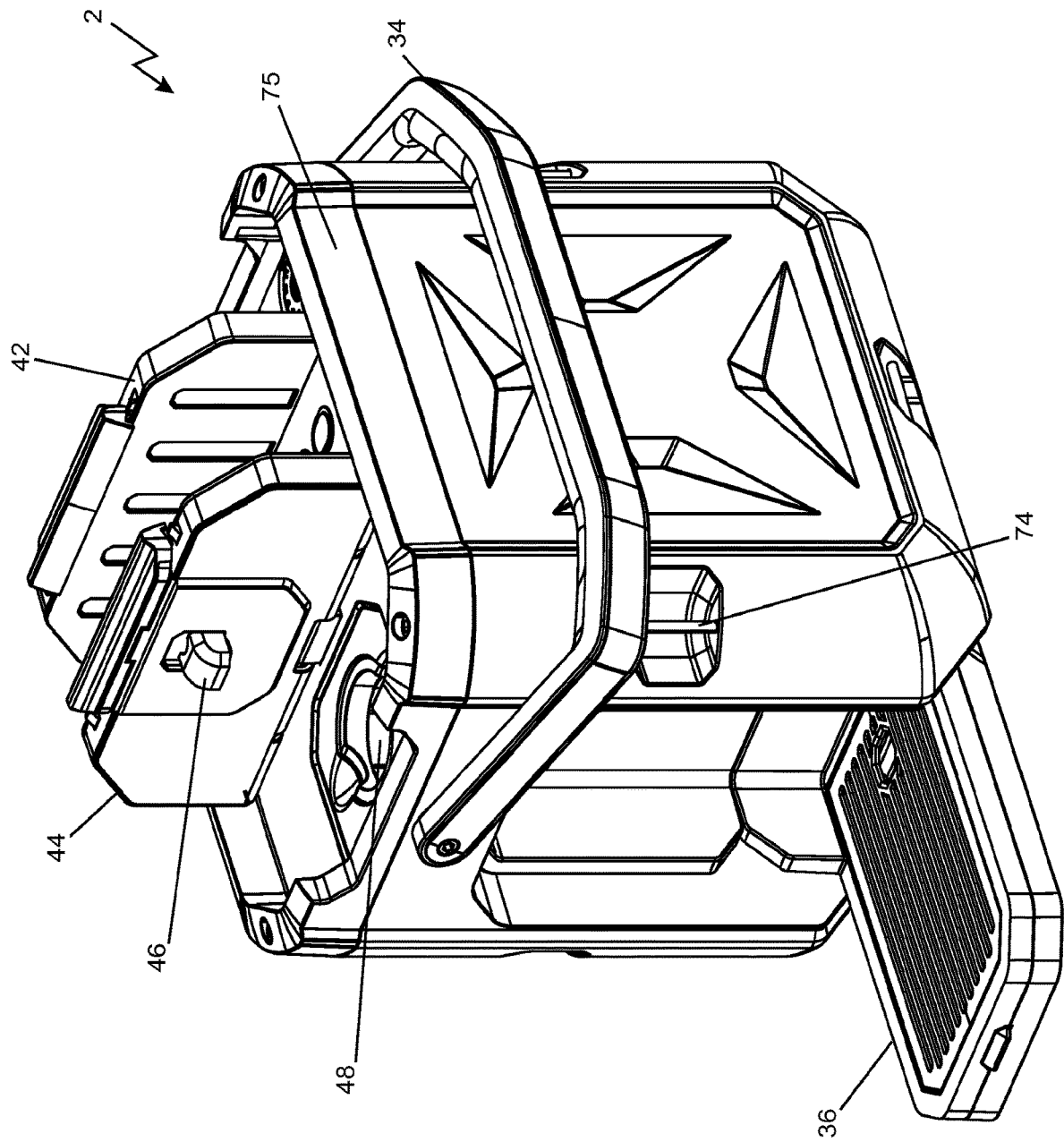
FIG. 3 depicts a view of the portable appliance in the upright position the doors to the water and brewing system in the open position and the stand in the open, deployed position.

The portion of the tubing 10a that joins the water system valve 8 is housed within the water system door 42 as seen in FIGS. 3 and 4. One skilled in the art will recognize that the water system door 42 is depicted as opening on a hinge 65. Tubing 10a exits water tank system door 42 thru joint 60a into the central portion of the appliance. Since the tubing 10, 10a runs through the door and only attaches to the water system 38 when the water system door 42 is closed, the tubing 10, 10a must be protected by a joint 60a. When the water system door 42 closes and the tubing 10a is connected to the water system valve 8, it causes the tubing 10a to press into seal 19 which in turn presses into spring 15 allowing water to flow from tube 13 to tubing 10a. Water can only flow out of the water tank 3 through the water system valve 8 into the tubing 10a when it is called creating a sealed system that is leak-proof.

To operate this appliance 2, a user selects the desired function on the user interface 32. This action sends a signal to the electronics 14 which controls the action of the mechanical system 39. The electronics 14 and water delivery system 39 are shock resistant and the water delivery system is located on a chassis 41 further comprising shock absorbers 62 to further insulate the mechanical system from shocks that could disrupt the appliance's operation.

To draw water from the water tank 3, the pump 18 pumps water from the water tank 3 out of the water system valve 8 into the tubing 10. The water runs through the tubing 10 and is measured by the flow meter 16. The flow meter 16 controls how much water is to be drawn from the water tank 3. The water is then pumped through the heater 20 by the pump 18. After the water is heated, it is routed from the flow valve 22 either to be brewed as a beverage or to be dispensed as hot water. The routing directs water to either a water line 10c that dispenses hot water or a beverage line 10b that dispenses the beverage.

If a user desires hot water, the water simply flows from the flow valve 22 through water line 10c into the water nozzle 30 and into a waiting cup 50 that may be located on a stand 36. The water nozzle 30 is separate from the beverage nozzle 28 so that a user can ensure that clean water is dispensed.

When a beverage is to be brewed, water flows from the flow valve 22 through the beverage line 10b to the brewing system 40.

When a user desires to operate the appliance and brew a beverage, a command is pressed on the user interface 32. The brewing system 40 comprises a brewing chamber 48, at least one nozzle 28 and piercing needles 24. A beverage capsule 26 is placed into the brewing system 40 at the brewing chamber 48. The brewing chamber 48 is anticipated to be operable in the closed position so as to access the chamber 48, it must be opened at a brewer system door 44. The action closing of brewing system door 44 pushes the beverage capsule 26 down to pierce onto output needle 49 at the bottom of brewing chamber 48. This point where the output needle 49 punctures the beverage capsule 26 provides an output hole at which brewed beverage can exit the beverage capsule 26. The brewing chamber 26 also comprises an input needle 24 located in the brewer system door 44. This input needle 24 can pierce the top of a beverage capsule 26 creating an input hole to allow to flow into the capsule 26 from the flow valve 22.

This input needle 24 is covered by movable needle cover 46 seen in FIGS. 7A and 7B. Movable needle cover 46 is moved by actuator 70. The brewing system door 44 has an open and closed position. The needle cover 46 covers the needle 24 when the brewing system door 44 is in the open position as seen in FIG. 7A. When the door 44 rotates to the closed position the actuator 70 moves the needle cover 46 into a retracted position and exposes needle 24 to pierce the beverage capsule 26.

Once the beverage capsule is in place within the brewing chamber 48, a beverage can be brewed within the brewing chamber 48 as water flows into the capsule 26. Heated water flows from the flow valve 22, through tubing 10, through needle 24, into beverage capsule 26. The beverage is brewed within the capsule 26 and flows out of the capsule 26 through the output hole into the beverage nozzle 28. Brewed beverage then flows from the beverage nozzle 28 into the cup 50 located on stand 36.

Figure 5B:
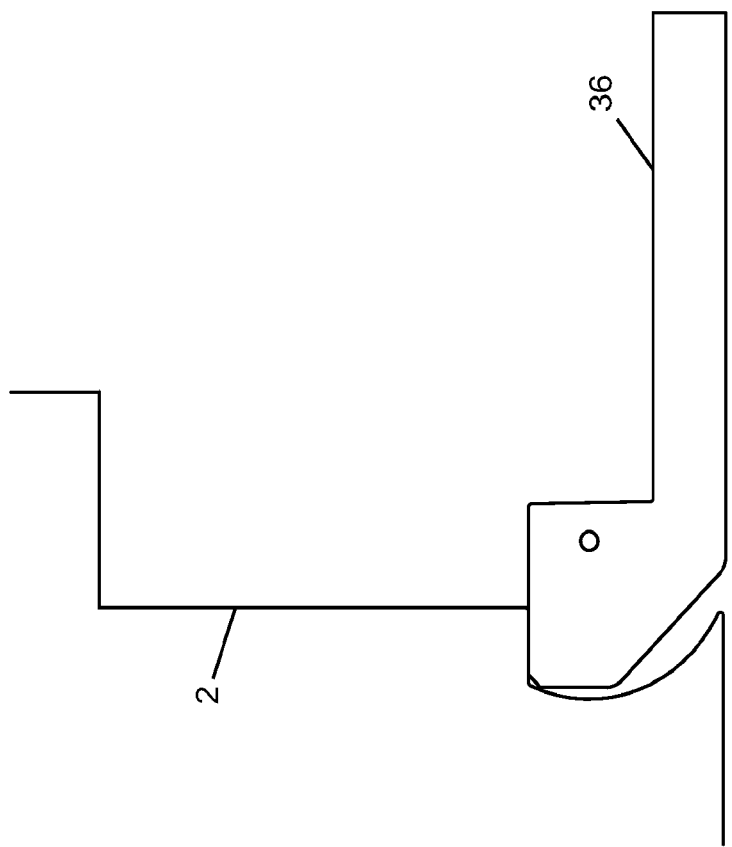
FIG. 5B depicts the side view of the stand in the open, deployed position.
Figure 5A:
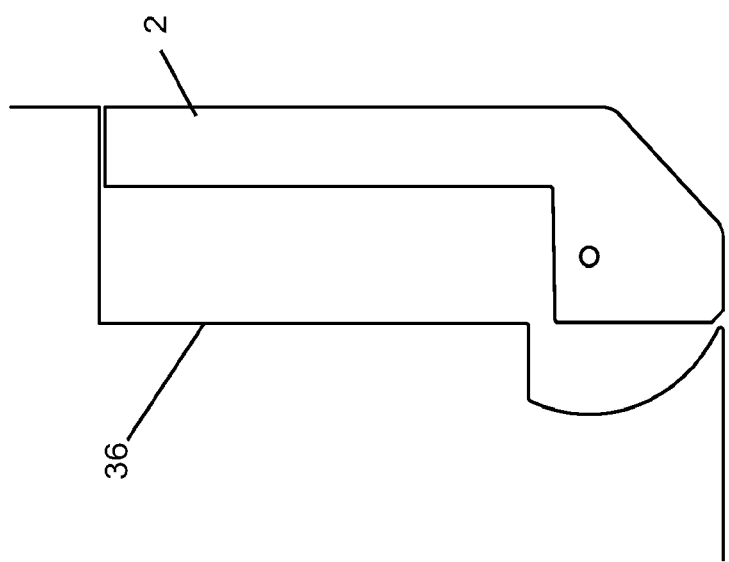
FIG. 5A depicts the side view of the stand in the closed, stowed position.
Figure 6:
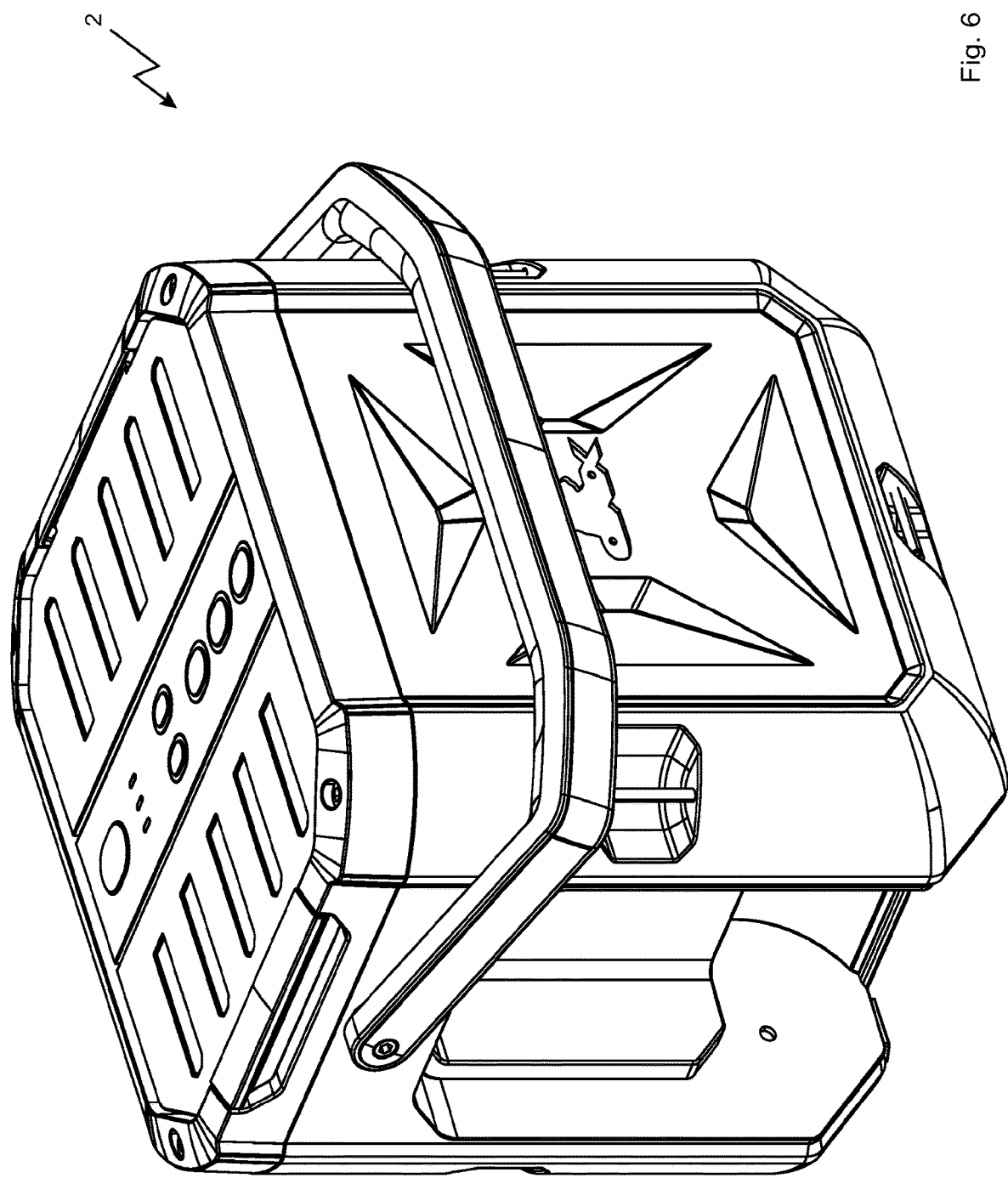
FIG. 6 depicts a view of the portable appliance with the stand removed from the portable appliance.
Figure 8:
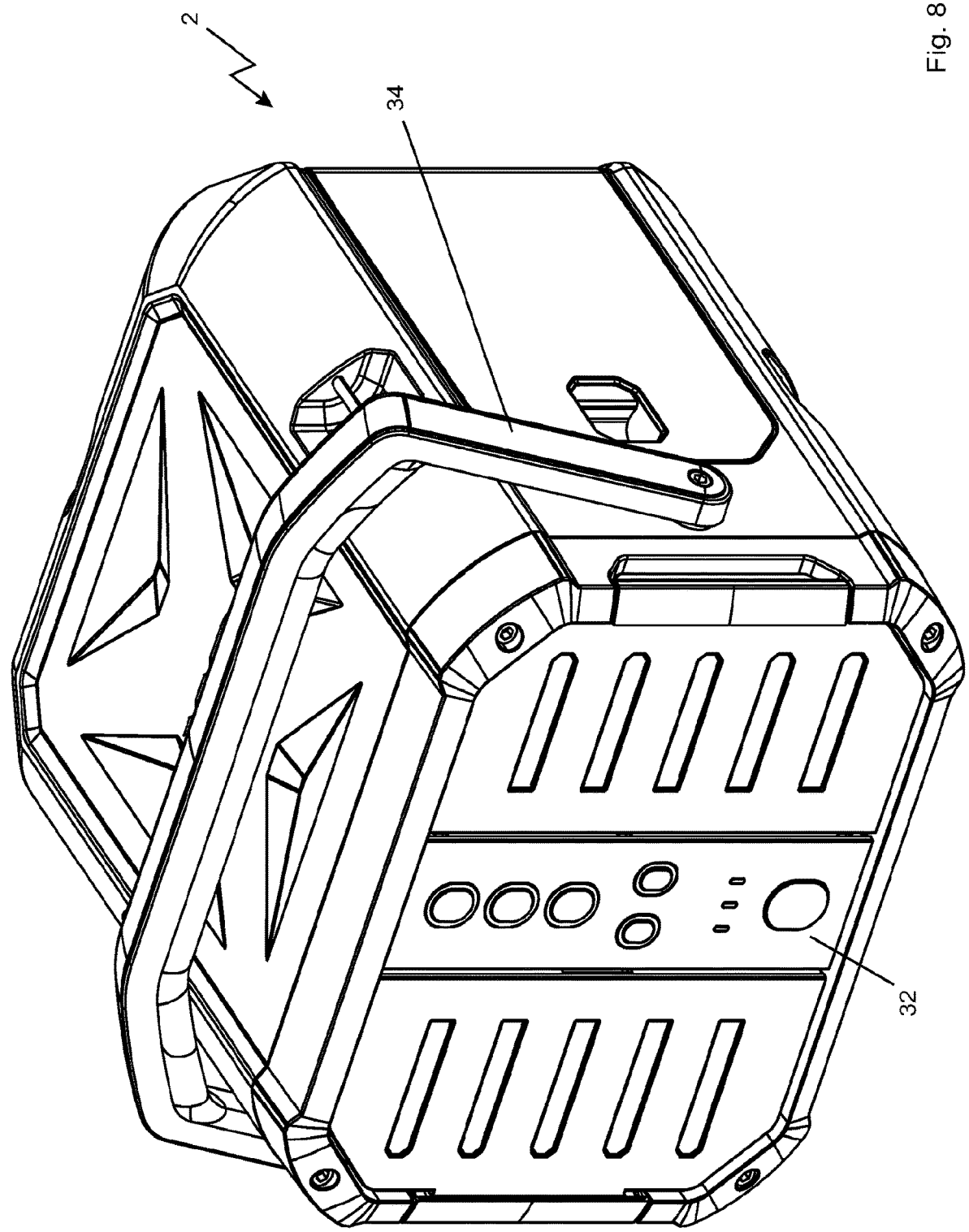
FIG. 8 depicts a detailed view of device stored on its side
Figure 13:
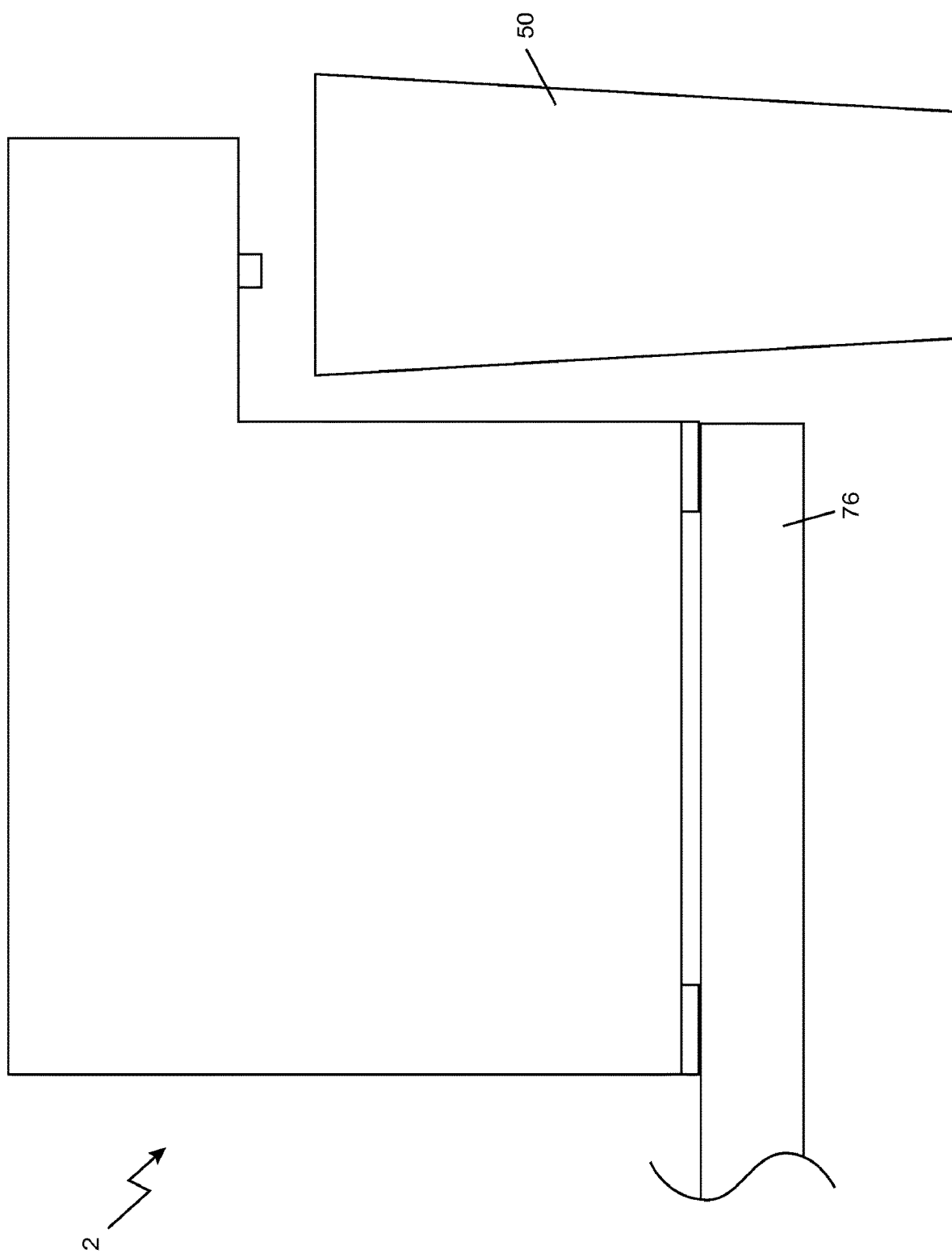
FIG. 13 depicts cross section view showing unit partially overhanging support surface.
Figure 14:
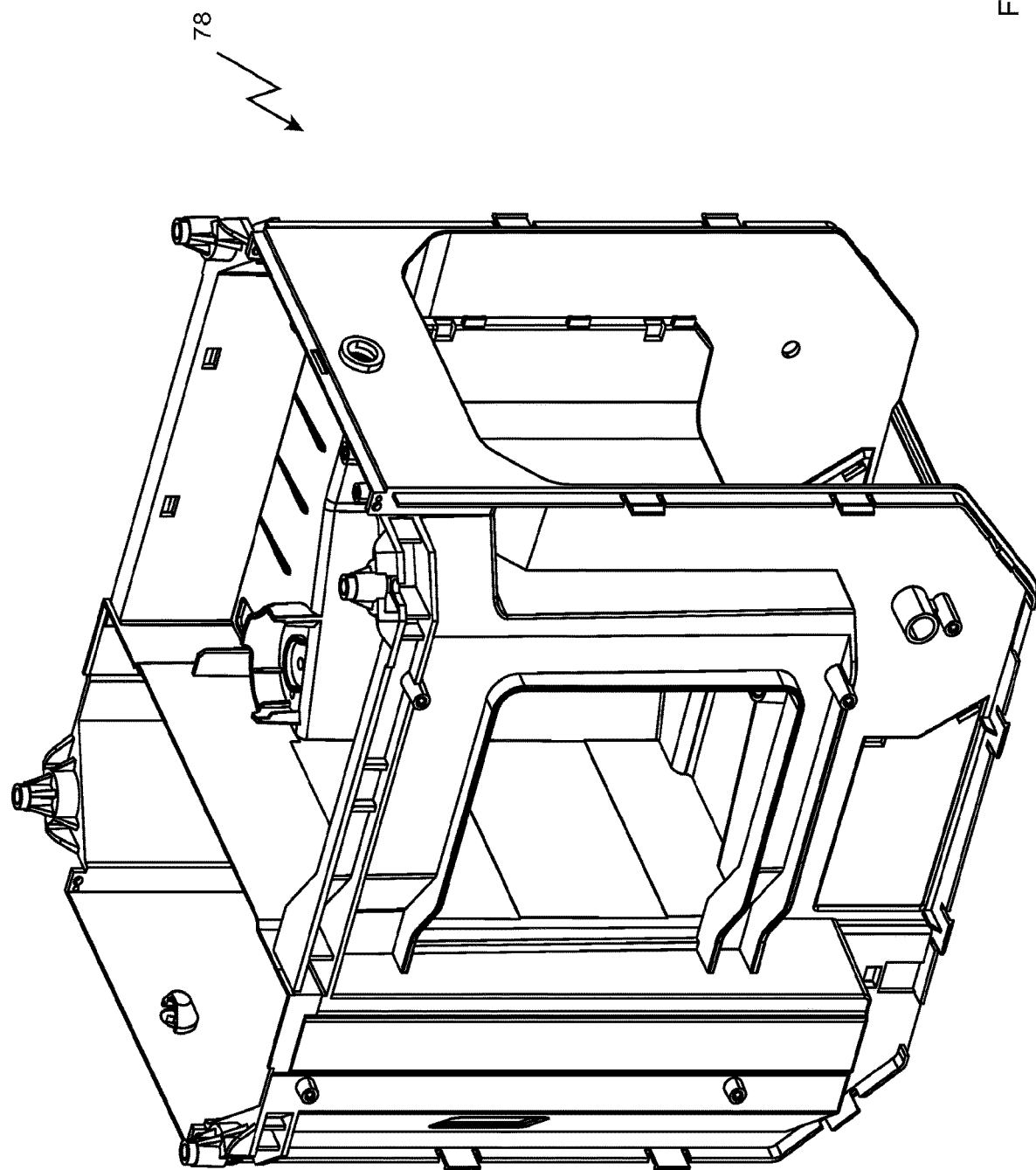
FIG. 14 depicts the internal support frame.

Turning to FIGS. 5A and 5B, the stand 36 folds into and out of the appliance 2. The stand 36 is also removable as seen in FIG. 6. FIG. 13 depicts a view of the appliance 2 where the stand 36 is removed and the cup 50 overhangs the appliance's support surface 76.

The appliance is equipped with a safety sensor 58. This sensor senses whether or not a user opens the brewing chamber while a hot beverage is being brewed. If the brewing system door 44 is opened while hot water or residual steam is being pumped from the flow valve 22 into the brewing system 40, this safety sensor 58 triggers the water to stop flowing and switches the flow valve to direct the water to instead flow into the water line 10*c* and out water nozzle 30 away from a user.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The invention claimed is:

1. An appliance for brewing a beverage comprising:
   an external housing comprising:
      a protective frame comprising an impact resistant material and having a bottom wall, two opposing side walls, two opposing end walls, and a top wall;
      a water tank system door rotatable relative to the protective frame; and
      a brewing system door rotatable relative to the protective frame; said external housing encapsulates a water tank system, a brewing system, and a water delivery system;
   an internal support frame separate from the protective frame of the external housing, the internal support frame comprising a bottom wall, two opposing side walls and two opposing end walls that together have a hollow shape, with each wall of the internal support frame being coupled to and supporting at least one associated wall of the external housing, such that the internal support frame receives loads applied to the external housing;
   a water tank system encapsulated within a water tank compartment defined by the external housing and the internal support frame, the water tank system comprising a removable water tank, a cap, and a water system valve, wherein the water tank is accessible and removable from the water tank compartment with the water tank system door in an open position;
   a brewing system encapsulated by the combination of the external housing and the internal support frame, the brewing system comprising a brewing chamber for receiving a single serve beverage capsule;
   a water delivery system encapsulated by the combination of the external housing and the internal support frame, the water delivery system comprising a tube, a flow meter, a pump, a heater, and a flow valve; and
   a user interface located on the top wall of the protective frame for receiving inputs and controlling the appliance with electronics, wherein the user interface is shock proof, dust proof, and water proof, wherein the user interface is recessed below the protective frame.

2. The appliance of claim 1, wherein the bottom wall and at least one other side or end wall of the external housing form a one piece structure without a seam.

3. The appliance of claim 1, wherein the water tank system is spill proof and leak proof in any orientation once sealed when removed from the appliance or when installed in the appliance and is protected on all sides, and wherein the water tank system is impact resistant.

4. The appliance of claim 1, wherein the brewing chamber of the brewing system is accessible with the brewing system door in an open position; wherein the brewing system door further comprises an input needle; and wherein an output needle is located at the bottom of the brewing chamber and upon closing of the brewing system door, the output needle pierces the single serve beverage capsule creating an output hole and the input needle pierces the beverage capsule creating an input hole.

5. The appliance of claim 4, wherein the input needle is part of a piercing device comprising a needle cover that rotates to cover the input needle when the brewing system door is open and recesses to expose the input needle when the brewing system door is closed.

6. The appliance of claim 1, wherein upon receiving a command, the electronics signal the pump to draw water up out of the water tank into the plurality of tubes and flows the water through the flow meter; the pump then pumps the water through the heater; once the water is heated, the water runs through the third section of the plurality of tubes via a direction away from the flow valve to the brewing system via the input hole of the beverage capsule wherein a beverage is brewed in the beverage capsule and flows out the output hole into a beverage nozzle that empties into a cup.

7. The appliance of claim 1, wherein upon receiving a command, the electronics signal the pump to draw water through the first section of the plurality of tubes and then pump water through the heater; once the water is heated it runs through the second section of the plurality of tubes into a water nozzle and into the cup.

8. The appliance of claim 1, wherein the electronics are located within an internal chassis that is provided within an internal chamber within the internal support frame, wherein the internal chassis is damped to prevent damage from shock and impact.

9. The appliance of claim 1, further comprising a cup stand that rotatably couples to the internal support frame, such that the cup stand recesses into an opening in one end wall of the external housing in a closed position to form an extension of the end wall, and such that the cup stand extends transversely relative to the end wall in an open position.

10. The appliance of claim 1, further comprising a handle that is rotatably relative to the external housing through a first end, which pivotally couples to a first of the two end walls of the protective frame, and a second end, which pivotally couples to a second of the two end walls of the protective frame.

11. The appliance of claim 1, wherein the electronics are supplied power by electric power, wherein electric power is supplied by either a power cord, an array of batteries, or a combination of the power cord and the array of batteries.

12. The appliance of claim 1, wherein each wall of the protective frame of the external housing has a flat portion allowing for the appliance to be stowed in a stable manner in more than one orientation.

13. A portable appliance for brewing a beverage, the portable appliance comprising:
   an external housing comprising:
      a protective frame including a bottom and a plurality of walls interconnected with the bottom;
      a water tank system door movable relative to the protective frame; and
      a brewing system door movable relative to the protective frame;
   an internal support frame separate from and disposed within the external housing, the internal support frame having a base and a plurality of walls forming a hollow structure that supports the external housing upon loading from any direction;
   a water tank system disposed within a water tank compartment defined by the external housing and the internal support frame, the water tank system comprising a removable water tank located in the water tank compartment;
   a brewing system disposed within the external housing and the internal support frame, the brewing system having a brewing chamber for receiving a single serve beverage capsule; and
   a water delivery system disposed within the external housing and the internal support frame, the water delivery system comprising at least one of a tube, a flow meter, a pump, a heater, and a flow valve.

14. The portable appliance of claim 13, wherein the base of the internal support frame couples to and supports the bottom of the external housing.

15. The portable appliance of claim 14, wherein the plurality of walls of the internal support frame comprises two opposing end walls and two opposing side walls interconnected with the base and the two opposing end walls; and wherein each side wall and each end wall of the internal support frame couples to and supports a portion of the external housing.

16. The portable appliance of claim 15, further comprising a user interface supported by a top wall of the protective frame and configured to receiving an input and control the appliance with electronics based on the input.

17. The portable appliance of claim 16, wherein the water tank system door is located adjacent to a first side of the top wall and is pivotally coupled to the internal support frame about a first pivot axis, and wherein the brewing system door is second side of the top wall and is pivotally coupled to the internal support frame about a second pivot axis.

18. The portable appliance of claim 15, wherein the internal support frame comprises an internal wall that extends between two opposing side walls of the plurality of walls of the internal support frame, and wherein the internal wall and a first of two opposing end walls of the plurality of walls of the internal support frame define the water tank compartment.

19. The portable appliance of claim 18, wherein water tank system comprises a cap, which detachably couples to the water tank, and a water system valve, which is removably received within the water tank.

20. The portable appliance of claim 19, wherein the water delivery system comprises each of the tube, the flow meter, the pump, the heater, and the flow valve, and at least a portion of each of the tube, the flow meter, the pump, the heater, and the flow valve are housed inside the internal support frame.

* * * * *